United States Patent [19]

Kotcharian

[11] 4,054,431
[45] Oct. 18, 1977

[54] METHOD AND DEVICE FOR REGENERATING AN IMPURE EFFLUENT FLUID AND PRODUCT OBTAINED THEREBY

[75] Inventor: Michel Kotcharian, Paris, France

[73] Assignee: Technigaz, France

[21] Appl. No.: 636,961

[22] Filed: Dec. 2, 1975

[30] Foreign Application Priority Data

Nov. 27, 1974  France .................. 74.38902

[51] Int. Cl.² .............. B01D 3/14; B01D 53/14
[52] U.S. Cl. ........................... 55/70; 55/89; 55/175; 62/17; 203/98
[58] Field of Search .............. 8/85 A, 125, 196; 55/70, 37, 89, 175, 208; 62/17, 20, 23, 24, 29, 31; 203/98; 423/359–363

[56] References Cited

U.S. PATENT DOCUMENTS

| 2,500,291 | 3/1950 | Liebel et al. ............... 55/70 X |
| 2,855,278 | 10/1958 | Adams et al. ............... 55/70 |
| 3,139,391 | 6/1964 | Walker ....................... 203/98 X |
| 3,322,652 | 5/1967 | Huval ......................... 203/98 X |
| 3,335,071 | 8/1967 | Bollen et al. ............... 55/70 X |
| 3,343,916 | 9/1967 | Cahn et al. ................. 423/359 |
| 3,406,006 | 10/1968 | Lindberg et al. ............ 8/125 |
| 3,743,699 | 7/1973 | Bogart ....................... 423/359 |
| 3,767,359 | 10/1973 | Calamari, Jr. et al. ...... 8/125 X |
| 3,915,632 | 10/1975 | Troope et al. .............. 8/125 |

Primary Examiner—Wilbur L. Bascomb, Jr.
Assistant Examiner—Robert H. Spitzer
Attorney, Agent, or Firm—Steinberg & Blake

[57] ABSTRACT

A method of processing an impure effluent fluid provided in two gaseous and liquid phases, respectively, for regenerating same to a pure re-usable substance, consisting in converting the gaseous phase into a liquid phase; subjecting each liquid phase separately to an independent fractional distillation for extracting said pure substance therefrom in the vapor state as an overhead product; condensing said pure substance into liquid condition, separately collecting the condensate from each fractional distillation by gathering same to form a separate storage and taking at least one part therefrom which will be cooled through heat exchange with a refrigerating fluid and jointly recovered.

11 Claims, 1 Drawing Figure

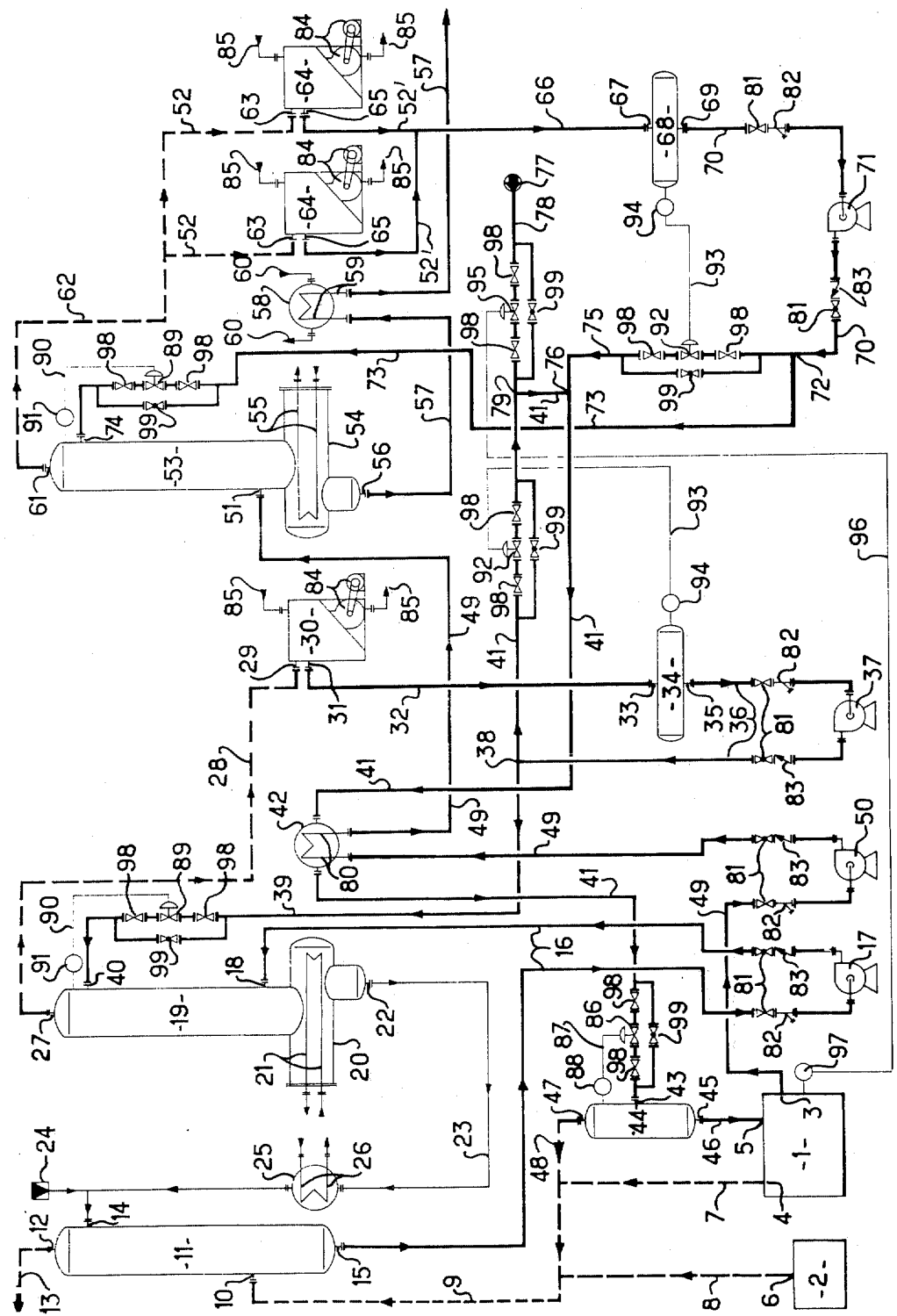

METHOD AND DEVICE FOR REGENERATING AN IMPURE EFFLUENT FLUID AND PRODUCT OBTAINED THEREBY

The present invention relates generally to and has essentially for its subject matter an improved method for mainly physically and in particular continuously treating or processing an impure effluent fluid forming a consumed residual substance or like waste material for instance constantly supplied in at least two gaseous and liquid phases, respectively, with a view to purifying or regenerating same to the condition of a substantially pure re-usable substance and a device for carrying out this method as well as by way of new industrial product the purified fluid thus obtained. The invention is also directed to the various applications and uses resulting from working or putting said method and/or device into practice as well as to the systems, assemblies, apparatus or appliances, machines, arrangements or contrivances, equipments, plants and installations provided with such devices.

An example of impure effluent fluid known in the prior state of the art and resulting from operating processes or methods of manufacture, production or preparation of products consists in particular of ammonia ($NH_3$) which is used for instance in the liquid state in the textile industry for the treatment or processing of textile rovings or slivers (of wool for instance) for spinning purposes and spinning mills or factories or for the mercerizing of threads in yarns. Such a treatment of textile materials is generally performed in machinery or apparatus wherein during the processing steps liquid ammonia becomes then charged with water and fatty substances (such as yolk or wool grease, oils and so on) and some ammonia will impregnate or soak the textile fibres, filaments or strands while being at least partially retained therein. Upon leaving this machinery the textile materials are then fed into a drying tunnel where the ammonia impregnating the textile materials will evolve or be released as vapours which will mix with the ambient air always present within the dryer. Indeed, to avoid any leakages of ammonia an underpressure or partial vacuum is purposely maintained as a safety measure within the dryers thereby causing ingress of environmental atmospheric air through the sealing joints and defective seals which air will become mixed with the ammonia vapours. Moreover, the internal additions and supplies or evolutions of heat within the machinery owing in particular to the cooling down or chilling of the initially hot or warm textile material as well as to the heat losses and to heat insulation deficiencies of the machinery will result in a partial vaporization or evaporation of the liquid ammonia present within the machinery.

Said impure residual liquid ammonia is generally recovered and regenerated, i.e., purified for being re-used but the gaseous ammonia leaving or flowing out of the machinery and dryers as vapours is generally lost. Furthermore, the existing or previously proposed methods and regenerating plants are relatively complicated hence expensive.

The purpose or object of the invention is therefore to remove the aforesaid inconveniences by providing a method of treatment enabling, on the one hand, to recover the gaseous products issuing or escaping from said industrial plants (such as the gaseous mixture of air and ammonia issuing from the dryers and the vapours of pure ammonia escaping from the machinery) and to regenerate same through a purifying or cleaning step for obtaining the processing fluid (such as ammonia) in a substantially pure liquid state and, on the other hand, to combine therewith a recovery of the impure processing fluid leaving said plants (such as the impure liquid ammonia issuing from the machinery) as well as its regeneration through a purifying or cleaning step in order to also extract therefrom the processing fluid in a pure liquid state, capable of being re-used within said plants. This engineering problem is solved by the method according to the invention for recovering and regenerating or purifying and cleaning an impure effluent fluid consisting of two phases, mainly a gaseous phase (such as a mixture of air and of ammonia vapour) and a liquid phase (such as impure liquid ammonia) which is characterized in that it consists successively in: possibly converting said gaseous phase into a liquid phase; subjecting each liquid phase individually to an independent fractional distillation for extracting therefrom the pure substance forming said fluid (ammonia for instance) in the vapour state as an overhead product or fore-running; condensing said pure substance into a liquid state; preferably separately collecting the condensate from each fractional distillation by gathering same to form a separate storage and taking at least one part therefrom which is possibly cooled down in particular through heat exchange with a refrigerating fluid or coolant and recovered jointly.

According to another characterizing feature of the invention at least another part is taken from one or each aforesaid storage to use same as an internal reflux stream for one or each aforesaid fractional distillation step in order to feed the latter as a descending or downward flowing liquid stream.

According to a further characterizing feature of the invention as applied to an aforesaid impure fluid the gaseous phase of which is a mixture (of air and gaseous ammonia for instance) the pressure of said mixture is raised through compression and said conversion of a gaseous phase into a liquid phase consists in causing said mixture to sparge or bubble in contact with an absorbing or solvent liquid agent through counter-current flow in order to selectively separate and remove therefrom every impurity (such as air) in a gaseous condition through dissolution of said substance (such as ammonia) within said absorbent or solvent liquid agent (such as water); then the solution of said substance thus obtained is recovered for causing same to undergo said fractional distillation and preferably said absorbent or solvent agent is afterwards recovered in the liquid state as a residue, bottoms product or after-running re-usable with a possible addition or supply of a make-up amount of said absorbent or solvent agent.

These features offer the advantage of a substantially full recovery and regeneration in the liquid state of the processing fluid such as ammonia contained within the gaseous products released or escaping from industrial plants such as machinery and dryers for treating textile materials.

According to still another characterizing feature of the invention the liquid distillate forming a residue, bottoms product or after-running resulting from each aforesaid fractional distillation step is, as known per se, heated up by bringing it to a boiling condition for instance through heat exchange with a heating fluid for partial vaporization generating a supply of heat to said distillation and the hot liquid (such as said solvent agent or a mixture of water and oils for instance) is then taken off and cooled down before its further use (as a solvent agent for instance) or treatment (recovery of the oils).

According to another characterizing feature of the invention as applied to said impure fluid under low pressure and with a hot gaseous phase (such as a hot mixture of air and ammonia issuing from the dryers) the pressure of each aforesaid liquid phase is mechanically raised (through compression for instance) prior to its aforesaid fractional distillation in order to be able to condense the gaseous distillate substantially at room temperature and said high pressure condensate is expanded down substantially to said low pressure after its aforesaid cooling step and before its being re-used as a recovered pure cold liquid substance (such as ammonia), preferably together with attendant instantaneous or flash vaporization of one part of said condensate, which part in the vapour state is then admixed to said gaseous phase to be processed for cooling same down.

According to still another characterizing feature of the invention as applied to said impure fluid with a cold liquid phase (such as impure liquid ammonia) said liquid phase is reheated after having possibly been pressurized but before its aforesaid fractional distillation to decrease therein the addition of heat to be supplied to the upward flowing or ascending gaseous stream in particular through heat exchange with a heating fluid consisting preferably of said recovered part of condensate for which said liquid phase then serves as a refrigerating fluid. This feature offers the advantage of a very economical operation since in the practical example mentioned the pure cold liquid ammonia issuing from the machinery serves to cool down the pure hot liquid ammonia resulting from said condensation while as a counter-part thereby reheating said impure liquid ammonia.

The method according to the invention is of course applicable to any impure effluent fluid but is particularly advantageous in its application to an effluent fluid consisting of waste ammonia containing air, water and fatty substances and having served to a treatment either for conditioning textile spinning rovings or slivers or for mercerizing textile yarns or threads and originating as liquid ammonia charged with water and with fatty substances and as pure gaseous ammonia from said treatment as well as gaseous ammonia charged with air from drying the textile materials thus processed.

The invention is also directed to a device forming a system or circuitry of pipe-lines or ducts and associated apparatus for carrying out said method of treatment for regenerating, as a pure substance, an aforesaid impure effluent fluid discharged in a gaseous and liquid state, respectively, from a utilization plant through at least two separate outlets, said device being characterized in that it comprises: possibly at least one apparatus for converting said gaseous phase into a liquid phase and the input for the gaseous phase to be converted of which is connected to each gaseous phase output of said plant; at least two fractional distillation columns or towers the inlets of which for the product to be distilled are connected to the liquid phase outlets of each aforesaid conversion apparatus and of said plant, respectively; at least two condensers the inputs of which are connected to the outlets for the overhead product or fore-running of said distillation columns, respectively; and preferably at least two buffer-tanks or receivers the inlets of which are connected to the outlets of said condensers, respectively, whereas their outlets are connected each one advantageously through the agency of an individual flow-impelling or inducing pump at least to each input feeding said plant with pure liquid fluid for instance through the medium of a common condensate coolant.

According to a further characterizing feature of the invention each aforesaid condensate outlet from one or each aforesaid buffer-tank is connected through the agency of said associated flow-inducing pump to the internal reflux inlet of one or each aforesaid associated fractional distillation column or tower.

According to another characterizing feature of the invention each aforesaid conversion apparatus is an absorption tower or the like for dissolving said substance in a solvent agent, said tower including a discharge means for the insoluble gases, an aforesaid liquid phase outlet for the solution of said substance and a solvent agent inlet connected to the outlet for the bottoms product forming a recovered solvent agent, of said associated distillation column and possibly to a source of make-up solvent agent whereas possibly at least one compressor or booster is inserted between each gaseous phase outlet of said plant and the gaseous phase inlet of said absorption tower.

According to still another characterizing feature of the invention each aforesaid distillation column comprises at least one reboiler means as known per se and its outlet for the bottom product or after-running is connected to at least one intermediate cooler or like refrigerating unit.

According to still a further characterizing feature of the invention the liquid phase outlet of each aforesaid conversion apparatus and of said plant is connected to said associated distillation column through the agency of a pressurizing pump whereas between the input for supplying said plant with pure liquid fluid and the output of said condensate cooler is mounted in series at least one expansion and flash vaporization drum the vapour outlet of which is connected to each aforesaid gaseous phase outlet duct of said plant.

Finally, according to still another characterizing feature of the invention at least one reheater is inserted in series between each liquid phase outlet of said plant and the inlet for the product to be distilled of said associated distillation column, said re-heater consisting preferably of a common heat exchanger forming said condensate cooler or refrigerating unit the cooling fluid passageway of which has said liquid phase to be distilled flowing therethrough whereas its heating fluid passageway has said condensate flowing therethrough.

The invention thus offers the advantage of a relatively simple construction of economical manufacture and working, adapted to operate fully automatically, requiring little supervision or monitoring and a relatively reduced maintenance or servicing and exhibiting an outstanding efficiency or yield hence a good profitability as well as a high operating safeness or dependability hence a good reliability.

The invention will be better understood and further objects, characterizing features, details and advantages thereof will appear more clearly when reading the following explanatory description with reference to the accompanying diagrammatic drawing given by way of non limiting example only illustrating a presently preferred specific form of embodiment of the invention and wherein the single FIGURE shows a block diagram of a complete plant according to the invention wherein the continuous lines drawn in thick solid lines represent liquid-carrying ducts whereas the discontinuous lines drawn in broken lines or dashes represent vapour-conveying pipe-lines.

In the examplary embodiment shown relating to a plant for recovering and regenerating ammonia serving for the processing of textile materials, the rectangular block 1 generally designates the whole machinery or enclosed spaces for treating textile materials with ammonia, which textile materials are then transferred into the dryers 2. The whole machinery 1 comprises at least one outlet 3 for liquid ammonia charged with water and with fatty substances and for instance at least one outlet 4 for pure gaseous ammonia as well as at least one inlet 5 for pure liquid ammonia whereas the whole system of dryers 2 comprises at least one inlet 6 for gaseous ammonia admixed with air. Attention should be paid at first to the circuit for recovering ammonia from the gaseous effluents issuing from the machinery 1 and from the dryers 2. The outlets 4 and 6 are respectively connected through ducts 7, 8 to a pipe-line 9 leading to the inlet 10 located at the lower or bottom portion of an absorption tower 11 or of an equivalent apparatus the top or upper portion of which is provided with an outlet 12 for substantially pure air communicating through a duct 13 with a discharge flue or stack or the like (not shown). At its upper portion or top the absorption tower includes an inlet 14 for water forming a solvent agent whereas at its base or bottom the tower 11 includes an outlet 15 for aqueous ammonia solution communicating by means of a pipe-line 16, possibly through the agency of a pressurizing pump 17 with the inlet 18 for the product to be distilled at the lower portion or bottom of a first fractional distillation column 19 advantageously comprising at its bottom a reboiler means or a like drum 20 the heating member 21 of which may consist either of a tubular coil or nest, bundle or cluster of tubes through which is flowing a stream of hot superheated steam or liquid water under pressure the generating boiler of which is not shown or of an electrical resistor or the like. At its bottom the distillation column 19 comprises an outlet 22 for the bottoms or after-running consisting of the recovered solvent agent such as water, which is connected by means of a pipe-line 23 (possibly through the medium of a flow-impelling pump not shown in case of lack of previous pressurization), to the inlet 14 for the solvent agent (water) of the absorption tower 11. To this inlet 14 is also connected a supply source of make-up water 24 whereas as intermediate cooler 25 is advantageously mounted in series in the pipe-line 23 for returning the water in order to cool same. This intermediate cooler 25 consists advantageously of a heat exchanger comprising a tubular coil or like nest, bundle or cluster of tubes 26 for an auxiliary cooling fluid consisting advantageously of cold running water. When the vapour pressure or the boiling temperature of the solvent agent is close to that of the fluid to be absorbed (such as ammonia) it may be necessary to raise the working pressure of the absorption tower 11 by means of a compressor or booster inserted in the duct 9. At its top the distillation column 19 comprises an outlet 27 for the overhead product or fore-running consisting of pure gaseous ammonia which communicates through a pipe-line 28 with the vapour inlet 29 of at least one condenser 30 the condensate outlet 31 of which is connected through a pipe-line 32 to the inlet 33 of a reflux drum 34 the outlet 35 of which is connected by means of a main duct advantageously through the medium of a circulation-inducing pump 37 mounted in series, in parallel relationship while leading from a branching-off or junction point 38, on the one hand, to a reflux line 39 leading to an inner reflux inlet 40 at the top portion of the distillation column 19 and, on the other hand, to a condensate line 41 communicating advantageously through the agency of a heat exchanger 42 with the inlet 43 for pure liquid ammonia under pressure of an expansion and flash vaporization drum or like vessel 44 the base or bottom of which comprises an outlet 45 for pure expanded liquid ammonia connected through a duct 46 to the inlet 5 for pure liquid ammonia of the machinery 1 whereas its top comprises an outlet 47 for pure ammonia vapour connected through a branchingoff pipe-line 48 to the line 9 in parallel relation to the ducts 7 and 8.

The circuit system for regenerating impure liquid ammonia issuing from the machinery 1 will now be described. The outlet 3 for impure liquid ammonia is connected by means of a duct 49, advantageously through the medium successively of a pressurizing pump 50 and of the heat exchanger 42 mounted in series to the inlet 51 for the product to be distilled at the bottom portion of a second fractional distillation column 53 of the packed type for instance, the lower portion of which communicates with a reboiler means 54 having a reheater member 55 and which is similar in construction and principle of operation to said reboiler 20. At its base the distillation column 53 comprises an outlet 56 for the bottoms or after-running consisting in the present instance of a mixture of water and oils, which is connected by means of a pipe-line 57 to a station for further treatment not shown consisting for instance of a purifying, cleaning or scrubbing station accomplishing the separation of oil from water through gravity decantation or settling for instance operative by the difference in densities or specific gravities. In the pipe-line 57 is advantageously inserted in series a cooler 58 consisting of a heat exchanger the passageway 59 of which for the heat-carrying fluid to be cooled consists of a tubular coil or nest, bundle or like cluster of tubes inserted within the duct 57 whereas a stream of cooled water is advantageously flowing through its passage-way 60 for the cooling fluid to be heated.

The top of the distillation column 53 comprises an outlet 61 for the overhead product or fore-running consisting here of pure gaseous ammonia, which is connected through a duct 62 to the vapour inlet 63 of a single condenser 64 or of each one of a plurality (for instance a number of two) of condensers 64 through ducts 52 connected in parallel relationship to the pipe-line 62. The condensate outlet 65 of each condenser 64 is connected through a branching-off line 52' in parallel relationship to a preferably common pipe-line 66 leading to the inlet 67 of at least one reflux drum 68 the outlet 69 of which is coupled by means of a main pipe-line 70 advantageously through the agency of a flow-impelling pump 71 mounted in series, in parallel relationship to a branching-off or ramification point 72, on the one hand, to a reflux line 73 leading to the internal reflux inlet 74 and the upper portion of the distillation column 53 and, on the other hand, to a condensate line 75 branched at a point 76 off said condensate duct 41. While it is admissible to accept a less pure overhead product or fore-running (such as gaseous ammonia) at the output 61 of the distillation column 53, the descending or downwards flowing liquid reflux stream within this column and accordingly the reflux feed duct 73 may be omitted or dispensed with thereby resulting in power savings.

A storage tank 77 for make-up liquid ammonia is branched through a duct 78 off a point 79 of the condensate line 41.

The heat exchanger 42 forms a reheater means for the impure cooled liquid ammonia circulating in the pipe-line 49 and flowing through the tubular coil or nest of tubes 80 of the heat exchanger 42 and the latter forms at the same time a cooler for the relatively hot condensate circulating in the pipe-line 41 and flowing through the corresponding passage-way or path of travel of the exchanger 42.

Each one of the pressurizing pumps 17, 50 and circulation-inducing pumps 37, 71 is advantageously mounted between two cutout valves or stop-cocks 81 arranged in series upstream or on the suction side and downstream or on the pressure delivery side, respectively, of the pump, as well advantageously as between a filter or strainer 82 located on the suction side preferably downstream of the associated stop-cock 81 and a check valve or the like 83 located on the pressure delivery side preferably upstream of the corresponding cut-out valve 81.

Each one of the condensers 30 or 64 is desirably a surface condenser comprising a nest of tubes through which is flowing the product to be condensed such as ammonia and which is bathed or steeped in an ascending or upwards flowing air stream blown by a motor-fan blower set 84, said nest of tubes being also sprayed with a downwards flowing or descending water stream supplied by a source not shown and fed and drained away through a pipe-line 85 while streaming or trickling down upon the nest of tubes as known per se.

The condensate flow rate coming from each aforesaid condensate supply storage to feed the expansion or re-use of the regenerated fluid is made advantageously dependent in inter-locked or keyed follow-up relationship upon the instant or actual vapour pressure of said condensate resulting from said expansion. For this purpose, a servo-controlled regulating valve 86 is mounted upstream of each expansion drum such as 44 on the condensate feed line portion 41 located between the expansion drum 44 and the heat exchanger 42. The servo-motor or jacking ram-type power actuator for operating this valve is operatively connected through a self-acting follow-up transmission or like automatic gear system 87 possibly including pilot relays to a control member 88 forming a vapour pressure pick-up, sensor or detector or like measuring element mounted on the expansion drum 44.

Moreover, the flow rate of each aforesaid reflux stream coming from the associated condensate supply storage, respectively, to feed the corresponding fractional distillation with a downwards flowing or descending stream is made dependent in inter-locked or keyed follow-up relationship upon a variable operating parameter such as the load or charge flow rate within the pipe-lines 16 and 49, the column-head or condenser temperature or the actual or instant vapour pressure of said corresponding overhead product or fore-running so as to keep this parameter substantially constant through automatic feed-back control. For this purpose a servo-controlled regulating valve 89 is mounted upstream of the reflux inlet 40, 74, respectively, of each aforesaid fractional distillation column 19, 53 in the pipe-lines 39, 73 feeding reflux to the latter. The servo-motor member or the jacking ram-type power actuator of each valve 89 is operatively connected through a self-acting follow-up transmission or like automatic interlocking gear system 90 to a control member 91 forming a pick-up sensor, detector or like element for measuring said operating parameter and provided for instance on the associated distillation column 19, 53.

Preferably the condensate flow rate coming from each condensate supply storage, respectively, for feeding the re-use of said pure liquid ammonia is made dependent in keyed follow-up or interlocked relationship upon the actual amount of condensate collected so as to keep said amount substantially constant through automatic feed-back control. For this purpose a servo-controlled regulating valve 92 is mounted upstream of each aforesaid reflux drum 34, 68 on the pipe-line 41, 75 connecting each reflux drum, respectively, to the feed inlet 5 of the plant 1, the valve 92 associated with the reflux drum 34 being desirably mounted between the branching-off point 38 and the heat exchanger 42 whereas the valve 92 associated with the reflux drum 68 is preferably fitted between the branching-off points 72 and 76. The servo-motor member or jacking ram-type power actuator for each regulating valve 92 is operatively connected through a self-acting follow-up transmission or like automatic interlocked gear system 93 to a control apparatus 94 forming a liquid level indicator or like gauge provided on each reflux drum 34, 68, respectively.

The partial condensate stream which is to flow back to the machinery 1 is possibly admixed with a make-up amount of a pure liquid substance such as liquid ammonia the flow rate of which is preferably made dependent in keyed follow-up or interlocked relationship upon the amount required at the station using said pure substance for keeping this amount substantially constant through automatic feed-back control. For this purpose, a servo-controlled regulating valve 95 is fitted in series between the supply source of make-up liquid 77 and the branching-off point 79 in the pipe-line 78 through which said source is branched in parallel relationship off the common back-flow duct 41 for returning the condensate, connecting the outlet of each reflux drum 34, 68 to the feed inlet 5 of the plant 1. The servo-motor member or jacking ram-type power actuator for this regulating valve 95 is connected through a self-acting follow-up transmission or like interlocked gear system 96 to a control member 97 forming a liquid level indicator or like gauge provided on the plant or closed casing 1.

Each aforesaid regulating valve such as 86, 89, 92 and 95 is preferably fitted between two cut-out valves or stop cocks 98 provided before or upstream and after or downstream, respectively, of the regulating valve involved which may thus be selectively isolated for being rendered inoperative or put out of service, for purposes of maintenance or repair or replacement. Moreover, a globe or screw-down valve or like hand operated adjusting cock 99 is mounted in by-pass relationship on each duct 39, 41, 73, 75 and 78 so as to by-pass or short-circuit each aforesaid regulating valve 86, 89, 92, 95 together with both of its cut-out valves 98.

The servo-motor member of each aforesaid regulating valve is desirably of the pressure fluid for instance pneumatically operated kind.

The operation of this arrangement is then the following when successively considering the circuits for re-covering impure gaseous ammonia and impure liquid ammonia, respectively. The hot mixture of gaseous ammonia and air issuing from the dryers 2 through the pipe-line 8 at a temperature for instance of about 120° C is admixed to the pure cold gaseous ammonia (at a temperature of −30° C for instance) issuing from the machinery 1 through the duct 7 and this mixture at a temperature of about 50° C is fed through the pipe-line 9 to the absorption tower 11 where it is caused to bubble according to an ascending flow in counter-current relationship with a descending water flow or trickling stream supplied by the duct 23 and/or the make-up water supply source 24 so that the gaseous ammonia will dissolve in the water to form an aqueous solution of ammonia drained away at the bottom through the pipe-line 16 while thereby becoming separated from the air which is discharged or drained away at the top through the duct 13. The aqueous ammonia solution thus obtained substantially at atmospheric pressure and conveyed through the pipe-line 16 is raised to a pressure of about 16 bar for instance by the pressurizing pump 17 and then sent into the distillation column 19 where the ammonia is stripped or caused to get rid of its solvent agent (water) which is heated again in the reboiler 20 at the bottom of the column and fed back through the duct 23 to the absorption tower 11 after having been previously cooled in the cooler 25. The gaseous distillate consisting of pure ammonia leaves the distillation column 19 through the duct 28 to be fed to the condenser 30 where the ammonia vapour will condense into liquid ammonia leaving the condenser through the pipe-line 32 for being collected in the reflux drum 34 forming a storage tank. The pure liquid ammonia from the storage tank 34 is taken up again by the circulation-inducing pump 37 for having one part thereof fed back through the duct 39 in the form of reflux into the distillation column 19 in order to feed the ascending stream therein whereas the other part from the whole amount discharged by the pump 37 and being at a temperature of about 40° C for instance is carried through the pipe-line 41 to the heat exchanger 42 where it is cooled down to a temperature of about −20° C for instance by the cooling fluid consisting of the impure liquid ammonia flowing through the heat exchanger 42 in the reverse direction through the pipe-line 49. The pure liquid ammonia flowing out of the heat exchanger 42 is fed through the duct 41 to the expansion drum 44 where the liquid under a pressure of about 16 bar is expanded substantially down to atmospheric pressure while at the same time being cooled down substantially to the boiling temperature of −33° C of liquid ammonia at atmospheric pressure whereas one part of this liquid is simultaneously vaporized. The liquid ammonia thus expanded flows out of the drum 44 and is fed again through the pipe-line 46 into the machinery 1 whereas the cold ammonia vapour leaving the drum 44 through the pipe-line 48 is admixed to the other gaseous effluents flowing out of the machinery 1 and dryers 2 through the pipe-lines 7 and 8 in order to cool same down.

The pure liquid ammonia issuing from the machinery 1 through the pipe-line 49 at a temperature of about −33° C and substantially at atmospheric pressure is carried into the pressurizing pump 50 which raises its pressure for instance up to about 16 bar and then delivers same through the heat exchanger 42 where the impure liquid ammonia is re-heated up to a temperature of about 35° C through heat exchange with the stream of pure liquid ammonia flowing through the heat exchanger 42 through the pipe-line 41. The impure liquid ammonia thus re-heated is fed into the fractional distillation column 53 where is performed the separation into pure ammonia vapour recovered or collected at the top of the column at a temperature of about 40° C for instance and into a liquid mixture of water and oil recovered or collected at the bottom of the column where it is re-heated in the reboiler 54. This mixture of water and oil leaves the distillation column 53 through the duct 57 and flows through the cooler 58 where the mixture is cooled down and then conveyed towards a purifying or cleaning station where the separation of water from oil is carried out. The pure gaseous ammonia gathered at the top of the column 53 is fed through the pipe-line 62 to the bank of condensers 64 where it will condense into pure liquid ammonia and where it is collected through the medium of the pipe-line 66 into the reflux drum 68 forming a storage tank. The pure liquid ammmonia stored within the drum 68 is taken again therefrom through the duct 70 by means of the flow-impelling pump 71 which will return one part thereof in the form of a reflux stream through the pipe-line 73 into the distillation column 53 for keeping up the descending liquid stream therein whereas the other part will flow to the pipe-line 41 through the duct 75 to follow there the same final path of travel as that followed by the pure liquid ammonia coming from the drum 34.

The pressure of ammonia vapour at the top of each distillation column 19, 53 is kept at a substantially constant value by the automatic feed-back control system previously described. Thus, if for instance the vapour pressure increases, this variation in pressure is detected by the associated pressure sensor or pick-up 91 which will then cause an increase in the opening of the regulating valve 98 so as to increase the flow rate of the cold reflux liquid which will cause thorough mixing the condensation of excess ammonia vapour and therefore a corresponding decrease in the vapour pressure. When then the liquid level is lowering within the associated reflux drum 34 or 68, this variation in level is detected by the corresponding level indicator or gauge 94 which would act upon the associated regulating valve 92 to further close it partially or totally thereby reducing the liquid flow rate leaving the drum until the normal or proper level has been restored therein. If then the level of liquid ammonia is lowering within the machinery 1 this variation in level is detected by the level indicator or gauge 97 which will be effective to act upon the corresponding regulating valve 95 to open same or increase its opening in order to supply an amount of pure liquid make-up ammonia from the storage tank 77. When the aforesaid sensed quantities (pressure and level) vary in opposite directions, respectively, the aforesaid regulating steps or actions will take place in the reverse direction with respect to that described hereinabove. The storage tank for the pure liquid make-up ammonia 77 also serves to compensate for the losses of ammonia due, on the one hand, to the fact that the residual ammonia will remain in the dissolved state in the water leaving the distillation column 19 through the pipe-line 23 and is carried along by said water and, on the other hand, to the fact that in the absorption tower 11 all the gaseous ammonia present is not fully dissolved in the dissolving water but is carried away and discharged or drained away in part with the air escaping through the duct 13 at the head or top of the tower 11.

The regulating valve 86 interlocked in keyed follow-up relationship with the pressure sensor 88 also serves to keep the ammonia vapour pressure in the expansion drum 44 at a substantially constant value according to a process similar to that described hereinabove. Each one of the manually operated globe or screw-down valves 99 serves to adjust the liquid ammonia flow rate either at the start when putting the plant into operation or in case of breakdown or failure of the associated servo-controlled regulating valve 86, 89, 92, 95.

The pressure rise brought about by each pump 17, 50 is effected with the purpose of raising the bubble point (or the condensation end temperature) of the fluid in order that the condensation in each condenser 30, 64 takes place at a temperature close to room temperature. Moreover, the usefulness of re-heating the impure liquid fluid circulating in the pipe-line 49 by means of the heat exchanger 42 is so that it enables to reduce the amount of heat to be supplied to the reboiler 54, thus resulting in power savings.

It should be noted that it would be possible to dispense with the production of pure ammonia vapour within the machinery 1 (and accordingly to omit the pipe-line 7) by fitting upstream of each feed inlet 5 of the plant or machinery 1 into the pipe-line 11 and for instance between the machinery 1 and each expansion drum 44 a refrigerating or cryogenic unit connected in series to said inlet 5 and adapted to adequately sub-cool the liquid ammonia forming said pure substance flowing at a temperature of −33° C out of the expansion drum 44 and before its use so as to lower its temperature to about −40° C for instance so that within the machinery 1 the ammonia will be heated up to −33° C without being vaporized, its at least partial vaporization being thus prevented during its use.

It should be understood that the invention is not at all limited to the form of embodiment described and shown which has been given by way of illustrative example only. In particular, it comprises all the means constituting technical equivalents of the means described as well as their combinations if same are carried out according to its gist and used within the scope of the appended claims.

What is claimed is:

1. In a method for utilizing and recovering a given substance, the steps of feeding said substance in liquid form to an apparatus wherein said substance is utilized while part thereof is converted at the apparatus into gaseous and liquid phases each of which is in an impure state, washing the gaseous phase to derive therefrom a solution of said substance and distilling said solution to achieve a pure gaseous phase thereof, simultaneously with the above steps distilling said impure liquid phase to achieve also from the same a pure gaseous phase, condensing the pure gaseous phases derived from both of said impure phases to achieve a pure liquid condensate, and returning the latter pure liquid condensate to the apparatus, whereby the part of the substance which is not used at the apparatus is continuously recovered in a closed circuit to be returned as a pure liquid to the apparatus.

2. In a method as recited in claim 1 and wherein said solution and said liquid phase are distilled separately from each other to provide two sources of the pure gaseous phase, and the latter two gaseous phases being condensed to provide said condensate.

3. In a method as recited in claim 2 and wherein the two sources of the pure gaseous phase are separately condensed to provide two pure liquid condensates, and combining said condensates to provide the pure liquid which is returned to the apparatus.

4. In a method as recited in claim 3 and wherein said solution and said liquid phase are simultaneously distilled in a pair of fractional distillation columns, respectively, and refluxing parts of said condensates, respectively, back through said columns.

5. In a method as recited in claim 2, utilizing the liquid resulting from distillation of said solution for at least part of a liquid used for washing said impure gaseous phase to provide said solution.

6. In a method as recited in claim 1 and including the step of flash-vaporizing the condensate prior to return thereof to the apparatus to achieve from the flash-vaporizing the pure liquid which is returned to the apparatus and a pure gaseous phase.

7. In a method as recited in claim 6 and including the step of combining the pure gaseous phase resulting from said flash-vaporizing with the impure gaseous phase.

8. In a method as recited in claim 1 and including the step of placing said liquid phase and said condensate in heat-exchanging relationship with respect to each other for cooling said condensate while elevating the temperature of said liquid phase, prior to distilling the latter.

9. In a method as recited in claim 1 and wherein the substance is ammonia.

10. In a method as recited in claim 9 and wherein the apparatus is a textile-treating plant.

11. In a system for recovering and utilizing a given substance, feed means for feeding said substance in liquid form, utilizing means for utilizing part of said substance while converting another part thereof into gaseous and liquid phases each of which is in an impure state, washing means communicating with said utilizing means for receiving therefrom said gaseous phase and for washing the same to provide a solution of said substance, distilling means communicating with said washing means and with said utilizing means for receiving from both of the latter means said solution and said liquid phase and for distilling said solution and said liquid phase to provide therefrom a pure gaseous phase, condensing means communicating with said distilling means for receiving therefrom the pure gaseous phase and condensing the same into a liquid condensate, and said feed means communicating with said condensing means for receiving said condensate therefrom to return the same to said utilizing means, flash-vaporizing means connected between said feed means and said condensing means for flash-vaporizing the condensate prior to flow thereof to said feed means, whereby from said flash-vaporizing means there is provided for said feed means a pure liquid phase as well as a pure gaseous phase, said flash-vaporizing means communicating also with said washing means for delivering thereto the pure gaseous phase together with said impure gaseous phase.

* * * * *